358-190. OR 3,621,134 SR

[redacted]

[11] 3,621,134

[72] Inventor Richard J. Waring
Auburn, Ind.

[21] Appl. No. 807,763
[22] Filed Mar. 17, 1969
[45] Patented Nov. 16, 1971
[73] Assignee The Magnavox Company
Fort Wayne, Ind.

[54] LOW B+ START CIRCUIT FOR LINE-OPERATED RECEIVER
9 Claims, 5 Drawing Figs.

[52] U.S. Cl. ........ 178/7.3 R, 178/DIG. 11, 307/297
[51] Int. Cl. ........ H04n 3/16
[50] Field of Search ........ 307/296, 297; 330/22, 40; 178/6 PS, 7.3

[56] References Cited

UNITED STATES PATENTS 3,461,232 8/1969 Wendt ........ 178/7.3

FOREIGN PATENTS 1,041,370 9/1966 Great Britain ........ 178/6

*Primary Examiner*—Roy Lake
*Assistant Examiner*—James B. Mullins
*Attorney*—Richard T. Seeger

ABSTRACT: A switching transistor is provided for a solid-state line-operated television receiver which allows the low B+ voltage requirements of the receiver to initially be supplied from the high B+ through the turned-on switch transistor and subsequently on switching of the transistor to its nonconductive state, the low B+ requirements of the receiver are met by rectifying the horizontal flyback transformer voltage pulse.

T5117
Rm

PATENTED NOV 16 1971

3,621,134

INVENTOR
RICHARD J. WARING
BY Jeffers and Young
ATTORNEYS

LOW B+ START CIRCUIT FOR LINE-OPERATED RECEIVER

This invention relates to B+ power supplies for line-operated receivers and more specifically to an improved system for supplying the low B+ power requirements of a line-operated television receiver.

Prior art television receivers normally meet their high and low B+ voltage requirements by having two secondary windings on a power transformer and then rectifying and filtering each of these two outputs to provide the required B+ voltages. Since such power transformers represent a substantial expense, it would be desirable to acquire the B+ voltage directly off the line with no intermediate power transformer, however, when this is done a simple resistive voltage divider network is needed to supply the low B+ voltage requirements. Such a voltage divider network consumes a substantial amount of power and causes excessive heating within the receiver. In order to overcome these disadvantages, the present invention contemplates supplying the low B+ voltage requirements by rectifying and filtering the output of the horizontal flyback transformer in the receiver. However, since the horizontal oscillator and driver operate from the low B+ supply, some means must be provided to initially start the circuits functioning.

Accordingly, it is one object of this invention to provide an economical direct-current supply for a receiver.

Another object of this invention is to eliminate the need for a power transformer within a receiver.

It is a further object of this invention to provide a power supply having substantially less heating loss. The present invention contemplates rectifying and filtering the line voltage so as to supply the high B+ requirements of a television receiver without the usual power transformer.

Accordingly, it is a further object of the present invention to supply the low B+ requirements by means of a switching transistor circuit from the high B+ voltage.

It is a yet further object of the instant invention to supply the long term low B+ requirements of a receiver by rectifying and filtering the output of the horizontal flyback transformer.

It is another object of the present invention to initially supply the low B+ requirements of the receiver from the high B+ supply and to subsequently supply the low B+ requirements from the output of the horizontal flyback transformer.

These and other objects and advantages of the present invention will be more clearly seen from the following description given in connection with the accompanying drawing in which.

Figures 1, 2, 3, 4, 5:
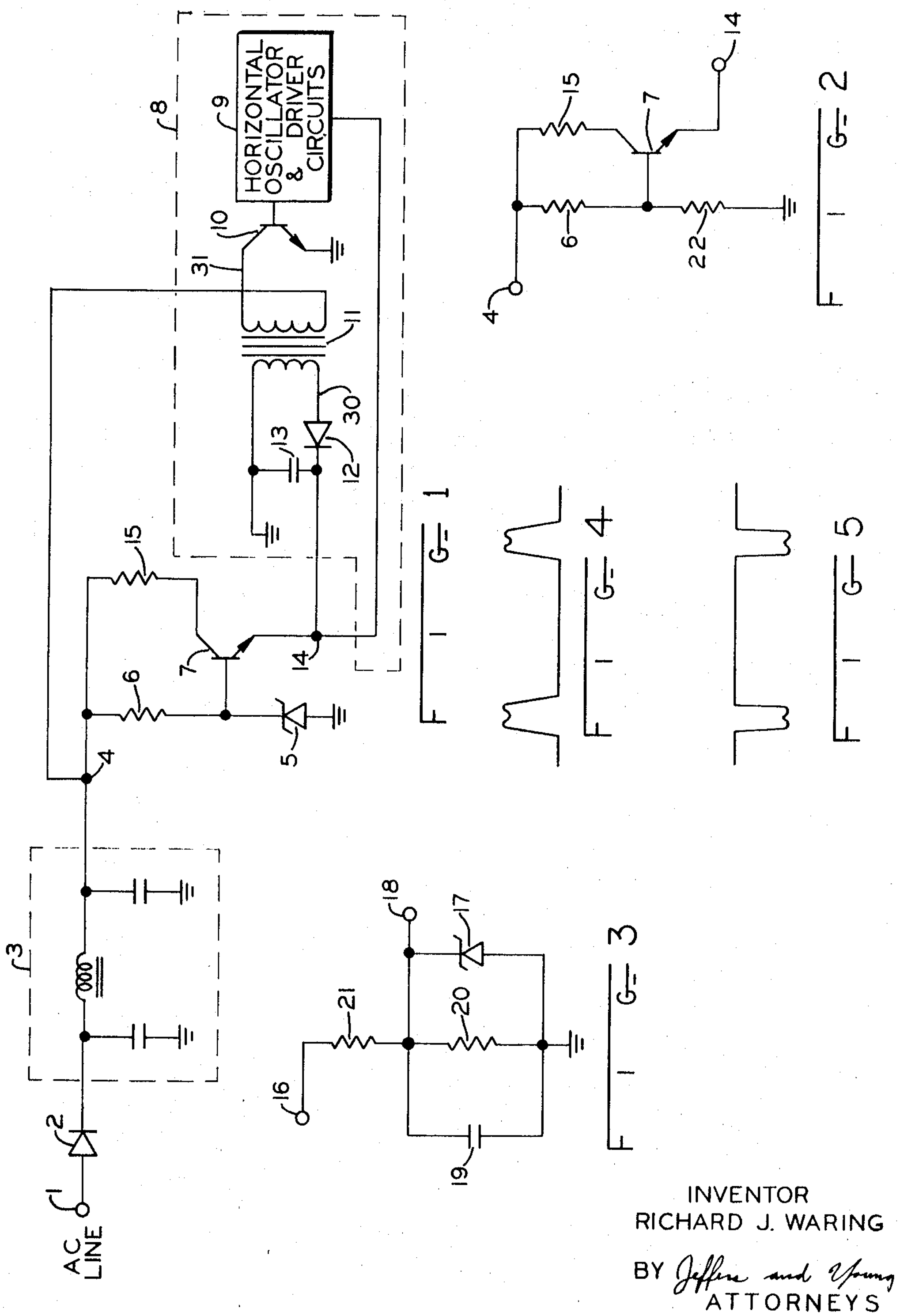
FIG. 1 is a circuit diagram of one embodiment of the invention showing a high B+ supply, a horizontal flyback voltage system and a switching transistor interconnecting the two.
FIG. 2 shows an alternate configuration for the switching transistor circuit.
FIG. 3 shows an alternative to the switching transistor circuit.
FIG. 4 shows the voltage waveform at 31.
FIG. 5 shows the voltage waveform at 30.

Referring now to FIG. 1, an alternating current supply is connected between the input terminal 1 and ground. This voltage is rectified by the diode 2 and passed through an appropriate filter 3 so as to supply a high B+ voltage at the terminal 4. In one specific embodiment this voltage was approximately 140 volts. A Zener diode 5 or other voltage-regulating device is connected in series with a resistor 6 between the high B+ supply and ground. The base of an NPN-transistor 7 is connected to the junction of the resistor 6 and the Zener diode 5. Thus, the Zener diode 5 maintains the potential at the base of the transistor 7 at a fixed value, for example here, 8 to 10 volts. A horizontal flyback voltage system 8 comprising horizontal oscillator and driver circuits 9, a horizontal output transistor 10, transformer 11, diode 12, and capacitor 13 could be used to supply the low B+ requirements of the receiver. Thus, if the horizontal oscillator circuits 9 were functioning, a sawtooth current would flow in the primary winding of the transformer 11 and the output voltage of the transformer, which is a series of pulses as shown in FIG. 5, could be rectified by the diode 12 and appropriately filtered for example by the capacitor 13 or other more complete filtering circuit to supply the low B+ requirements of the receiver at the terminal 14. However, for the horizontal oscillator circuits to function they must have a low B+ voltage applied to them. Thus, the circuit as so far described would never begin to function. This problem, however, is remedied by the presence of the switching transistor 7 which when the system is first turned on has it's base at about 8 to 10 volts, it's collector at 140 volts, and it's emitter at 0 volts. Hence, there is an initial current flow through the collector of the transistor which is limited only by the resistor 15. As this current flows, a charge is built up on the capacitor 13 and the potential of the terminal 14 increases. The positive potential of the terminal 14 is now able to supply the horizontal oscillator driver circuits with their low B+ requirements and thus the horizontal flyback voltage system 8 begins to function. After a time, the potential at the terminal 14 builds up until it exceeds the potential at the base of the transistor thus causing the transistor 7 to become nonconducting. In one specific embodiment the potential at the terminal 14 builds up to about 12 volts.

The advantages of having this switching transistor 7 in the circuit are most readily seen in reference to FIG. 3.

FIG. 3 shows a regulated voltage divider network which could be used to supply the low B+ requirements of the receiver directly from the high B+ voltage. In this circuit the potential at terminal 16 is achieved by rectifying and filtering the line voltage much as was done in FIG. 1. A Zener diode 17 regulates the low B+ output at terminal 18 to the desired level, and capacitor 19 ensures a ripple-free output. A resistor 20 may be included in parallel with the Zener diode 17 if the particular circuit requirements might overload the diode 17.

The significant aspect of FIG. 3 is that the resistor 21 must be a power resistor of from 15 to 20 watts dissipation capability adding considerably to the loading on the high B+ supply and to the heat within the receiver. This is a poor way of achieving the desired results in a receiver where the total power consumption may be 40 watts or less. The advantages of the circuit of FIG. 1 should now be apparent. The resistor 6 is a relatively high resistance, thus keeping the long term losses down to 1 watt or less. The resistor 15 is a relatively low resistance and will dissipate considerable power, however, the current flowing in the resistor 15 is shut off when the transistor 7 becomes nonconducting and thus the large power loss occurs only for a short period of time and the long term power loss and heating effect is nominal.

An alternative transistor switching circuit is shown in FIG. 2 and differs from that shown in FIG. 1 only in that a resistor 22 has been substituted for the Zener diode 5. The operation of this circuit is the same as that shown in FIG. 1, however, the potential at the base of the transistor 7 will vary somewhat due to variations in the current flowing in the resistor 22. This will result in tighter specifications on the switching transistor 7 and the increased cost of the transistor might exceed the savings of eliminating the cheap low power Zener diode.

To summarize the operation of the circuit in FIG. 1, when line voltage is applied to the terminal 1 the high B+ voltage at terminal 4 is almost immediately developed. This high B+ voltage causes the voltage at the base of the switching transistor 7 to rise to the Zener voltage which is a voltage somewhat less than the normal low B+ operating voltage of the system. Since the low B+ supply from the flyback voltage system is initially at 0 volts, the switching transistor will be turned on. The transistor therefore will draw collector current limited only by the resistor 15. In one preferred embodiment this resistor 15 was 300 to 500 ohms to keep the collector current within transistor limits. This collector current will cause the low B+ supply to increase in voltage and as this occurs the horizontal oscillator and driver begin to function and drive the horizontal output circuit. When this happens, the scan power contributes to development of the low B+ voltage and drives it to the regulated level. This regulated level was 12 volts in one embodiment. When the low B+ supply reaches this 12 volts figure and since the base of the transistor is at 8 to 10 volts as set by the Zener diode, the switching transistor is now reverse biased and becomes cut off with the emitter at 12 volts and the base at 8 to 10 volts. Under these conditions, the only power dissipated in the circuit will be in resistor 6 and the zener diode 5 and will probably be less than 1 watt.

While the invention has been described with reference to particular embodiments, it is to be understood that modifications may be made without departing from the spirit of the invention or from the scope of the appended claims.

I claim:

1. In a line-operated television receiver having both high and low B+ voltage requirements, a low B+ starting circuit comprising:
   a source of high B+ voltage within said television receiver;
   a switching transistor having a base emitter and collector;
   a first resistance coupled between said collector and said source of high B+ voltage;
   a second resistance coupled between said base and said source of high B+ voltage;
   voltage-regulating means coupled between said base and ground for maintaining the potential difference between said base and ground at a relatively fixed value whereby the switching of said transistor is controlled by the potential difference between said emitter and ground; and
   a source of low B+ voltage within said television receiver coupled to said emitter and requiring initial low B+ voltage in order to provide low B+ voltage, said initial low B+ voltage requirements being provided from said high B+ voltage source when said switching transistor is conductive, said switching transistor switching to its nonconductive state when the potential difference between ground and said emitter exceeds a predetermined value.

2. The combination of claim 1 wherein the voltage regulating means is a Zener diode so connected as to give a regulated voltage drop somewhat less than the low B+ voltage requirements of the receiver.

3. The combination of claim 1 wherein the resistance of said first resistance is substantially less than the resistance of said second resistance.

4. In a line-operated receiver having both high and low B+ voltage requirements, the combination comprising:
   first means for providing the high B+ voltage;
   voltage divider means coupled to said first means for initially supplying the low B+ voltage requirements;
   second means, requiring low B+ voltage, for providing low B+ voltage; and
   switch means responsive to the second means for initially enabling said voltage divider means and subsequently rendering inoperative the voltage divider means when said second means is fulfilling the low B+ requirements.

5. The combination of claim 4 wherein the switch means is connected in series with said voltage divider means and comprises a switching transistor which is initially conducting and which becomes nonconducting to render inoperative the voltage divider means.

6. The combination of claim 5 wherein said switching transistor has a base collector and emitter further comprising:
   voltage-regulating means for maintaining the base of said switching transistor at a fixed potential with respect to ground whereby said transistor is conductive when the emitter potential is less than that of the base and is nonconductive when the emitter potential exceeds that of the base.

7. The method of providing temporary low B+ voltage to start a low B+ generating system in a line operated receiver comprising the steps of:
   initially providing a high B+ voltage;
   starting the low B+ generating system with a portion of the available high B+ voltage;
   switching from the portion of the high B+ voltage to the low B+ generating system when the low B+ voltage becomes available, thus providing a self-sustaining low B+ generating system.

8. In a line-operated television receiver having both high and low B+ voltage requirements, a low B+ starting circuit comprising:
   a source of high B+ voltage;
   a switching transistor having a base emitter and collector;
   a first resistance coupled between said collector and said source of high B+ voltage;
   a second resistance coupled between said base and said source of high B+ voltage;
   voltage-regulating means coupled between said base and ground; and
   a source of low B+ voltage coupled to said emitter and comprising a capacitor and a horizontal flyback voltage system, said emitter being coupled to said horizontal flyback voltage system and to said capacitor.

9. The combination of claim 1, wherein the switching transistor is initially biased by the voltage regulating means to be in a conducting state and is subsequently forced to a nonconducting state by the build up of the low B+ voltage in said horizontal flyback voltage system.

* * * * *